Sept. 29, 1970 K. H. NORSWORTHY 3,531,720
DIGITAL SHIFT REGISTER FILTER WITH CONTINUING
FREQUENCY-FOLD SAMPLING AND TIME
SHARED SUB-BAND FILTERING
Original Filed Sept. 9, 1966 2 Sheets-Sheet 1

INVENTOR.
KEITH H. NORSWORTHY
BY
Christensen, Sanborn & Matthews
ATTORNEYS

SAMPLING GATE SEQUENCE (80 KC/S)

| SUB-BAND FILTER OUTPUTS | 1 | 2 | 3 | 4 | 5 | 6 | 7 | 8 | 9 | 10 |
|---|---|---|---|---|---|---|---|---|---|---|
| I | 0-1 | 8-7 | 8-9 | 16-15 | 16-17 | 24-23 | 24-25 | 32-31 | 32-33 | 40-39 |
| II | 1-2 | 7-6 | 9-10 | 15-14 | 17-18 | 23-22 | 25-26 | 31-30 | 33-34 | 39-38 |
| III | 2-3 | 6-5 | 10-11 | 14-13 | 18-19 | 22-21 | 26-27 | 30-29 | 34-35 | 38-37 |
| IV | 3-4 | 5-4 | 11-12 | 13-12 | 19-20 | 21-20 | 27-28 | 29-28 | 35-36 | 37-36 |

OUTPUT COMPONENT FREQUENCIES

INVENTOR.
KEITH H. NORSWORTHY
BY
Christensen, Sanborn & Matthews
ATTORNEYS

United States Patent Office 3,531,720

Patented Sept. 29, 1970

3,531,720

DIGITAL SHIFT REGISTER FILTER WITH CONTINUING FREQUENCY-FOLD SAMPLING AND TIME SHARED SUB-BAND FILTERING

Keith H. Norsworthy, Bellevue, Wash., assignor to The Boeing Company, Seattle, Wash., a corporation of Delaware Continuation of application Ser. No. 578,242, Sept. 9, 1966. This application Sept. 22, 1969, Ser. No. 864,939

Int. Cl. G01r 23/16, 27/02

U.S. Cl. 324—77 12 Claims

ABSTRACT OF THE DISCLOSURE

In the disclosed filter system an analog signal is recurringly sampled and the samples simultaneously digitized and fed into a digital shift register at a minimum sampling frequency high enough to insure that frequency folding under the sampling or Nyquist theorem is unambiguous over the full signal spectrum. Continuingly with such signal sampling the signal information stored in this digital shift register is filtered into desired frequency bands and converted into analog form by weighting and summation networks connected to the digital elements in the shift register. This analog band information is then itself recurringly sampled, multiplexed and digitized and applied to the input of a second digital shift register at a minimum common recurrence frequency which insures that frequency folding is unambiguous over each of the individual aforesaid bands, said common recurrence frequency effectively causing all of said bands to fold into the same spectrum band. Consequently, weighting and summation networks connected to the digit elements in the second shift register are enabled to serve as sub-band frequency filters shared by all the said frequency bands on a multiplex basis.

This application is a continuation of application Ser. No. 578,242 filed Sept. 9, 1966, now abandoned.

This invention relates to improvements in the art of filtering by the sampling or digital technique and is herein illustratively described in its preferred form as applied in a filter bank for separately detecting or filtering out a plularity of frequency components present simultaneously in a signal, that is to perform a continuing spectral analysis of the signal. However, it will be recognized that certain modifications and changes with respect to details may be made without departing from the essential features comprising the invention.

An object of this invention is to devise a sampling type filter bank which may be made physically much smaller than former tuned circuit filter banks. A further object is to provide a filter bank the frequency range of which can be altered simply by changing its internal clock frequency, either by a selected amount or in swept manner. A related object is to devise a sampling type filter having any desired number of stages and which is capable of dividing a frequency spectrum or band into a large number of separate frequency components or sub-bands with digital apparatus having relatively few parts and circuit connections. A further object is to permit use of micro-miniature integrated circuits employing relatively inexpensive digital shift register multistage modules of the type having external access leads only from the end stages.

A related object hereof is to effect further savings by serialized or time-sharing operation of signal processing means in the system. These savings are further multiplied by an arrangement of signal processing at an interim point within the system which combines the functions of time-sharing or multiplexing and time-coordinated frequency shifting (by folding) of component bands of the signal spectrum into the operating band of a commonly shared sub-band filter.

In accordance with one aspect of the invention one or more steps in the filtering operation employ to useful advantage a phenomenon which has customarily been avoided in prior systems, namely sampling at a frequency selected so as to produce a frequency folding effect. It has been known that if the sampling frequency is less than twice the highest component frequency in a signal spectrum the resultant samples do not provide an unambiguous representation of the signal spectrum. It is commonly considered that spectral components above half the sampling frequency become folded into the frequency range of zero to half the sampling frequency. A more strict interpretation of the sampling phenomenon might lead to the conclusion that the frequency components are not in truth folded but become ambiguously identified with frequency values symmetrical about multiples of the sampling frequency. However in the current application the validity of the concept of frequency folding is assumed, and signal filter theory as herein discussed is predicated on that basis.

As a specific feature hereof signal samples taken from successively related constituent bands of the signal spectrum in sequential order of the bands in continuously recurring cycles are further processed on a time-sharing basis in the same sub-band filter circuit so as to resolve the individual bands into a plurality of sub-bands the totality of which comprise the original signal spectrum. This is made possible by selecting the sequential sampling frequency so as to fold the frequency components of a plurality of such bands down into the same lower-frequency band (normally the lowest constituent band in the signal spectrum) and applying all bands in sequential order to the same sub-band filter circuit designed to separate component frequencies or sub-bands of the one low-frequency band. In the specific example by which the invention is described herein, such multi-band frequency folding and sequential sampling functions are performed by recurringly and sequentially energized band sampling gates which multiplex the bands into a commonly shared sub-band filter circuit.

In accordance with a further feature of this invention the sub-band filter circuit which processes the recurrent successive signal band samples comprises a multistage digital shift register having as many sample storage stages as are required to attain the desired degree of sub-band resolution or definition with only every $n^{th}$ stage providing an output to the weighting and summing networks which transform the samples stored in the register into the respective different sub-bands or frequencies, where $n$ equals the total number of bands multiplexed to the sub-band filter circuit. Intervening successive stages in this digital shift register store the successive band samples and step them along the register to the output stages in sequential order, but these intervening stages are not required to have external output leads of their own. As a result thereof, the invention permits use of relatively inexpensive production type integrated shift register modules in which cost is saved by providing output and input leads only for terminal stages of each module.

As a further feature, the invention may also employ frequency folding effects in preliminary processing of a signal ranging in frequency between $f_2$ and $f_1$ where $f_1$ is not zero. This is done by sampling at a frequency which folds the signal down into range $f_2'-f_1'$, where $f_1'$ is zero and where $f_2'$ minus $f_1'$ equals or exceeds $f_2$ minus $f_1$. The converted signal is then filtered into bands and thereafter into sub-bands in the described manner.

These and other features, objects and advantages of the invention will become more fully evident from the following description thereof by reference to the accompanying drawings.

Figure 1:
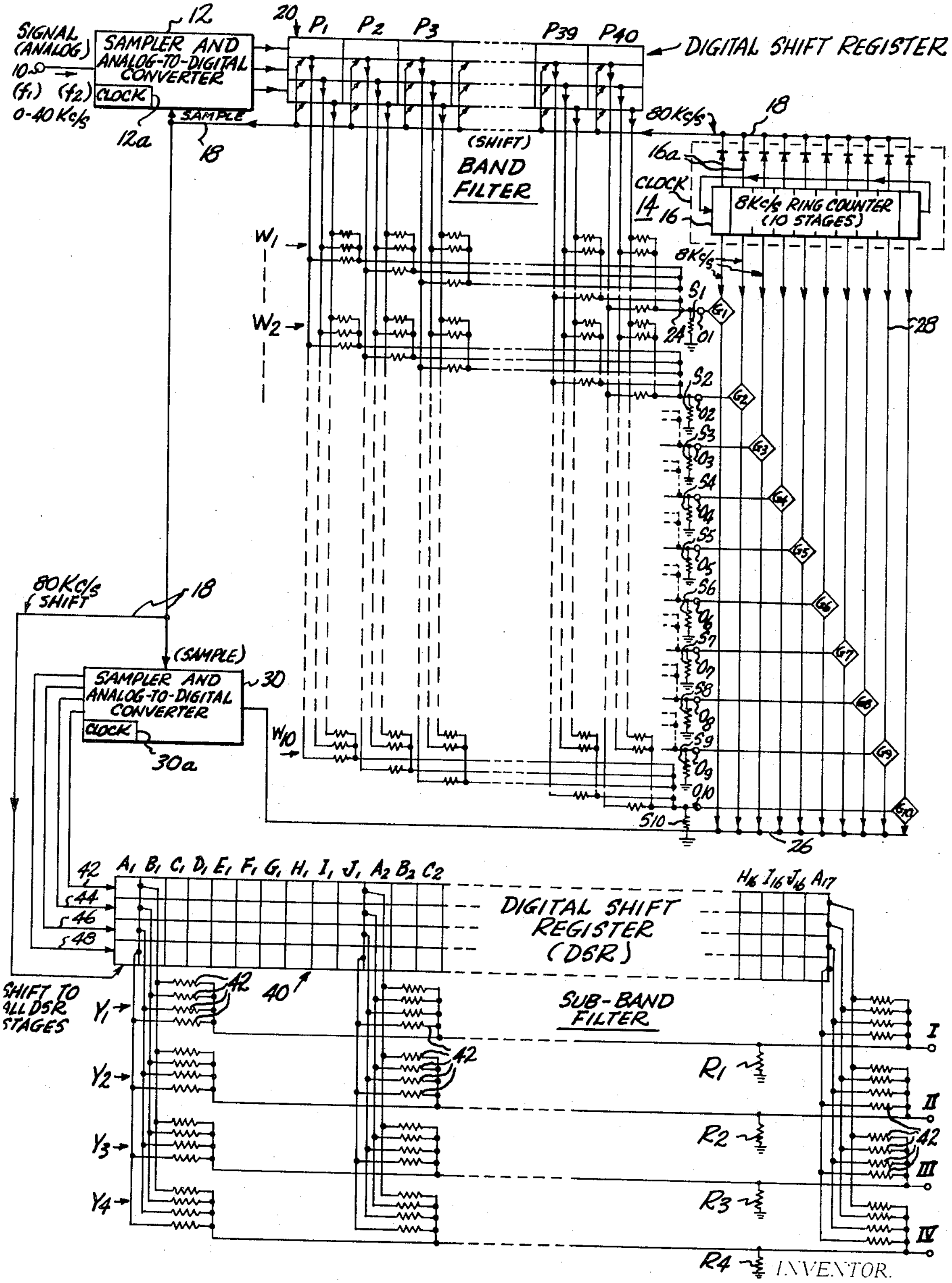
FIG. 1 is a diagram of a sampling filter system incorporating features of the invention.

In FIG. 1 the input signal, of analog form, applied to input terminal 10 comprises a spectrum band-limited to the range from a lower frequency ($f_1$) to an upper frequency ($f_2$). While these may be any frequencies it is assumed for simplicity of illustration that $f_1$ is zero and $f_2$ is 40 kilocycles per second. Under this condition no folding or frequency conversion of the signal is necessary prior to division into bands by the first stage of the filter. The input signal is sampled recurringly by the unit 12 referred to in the diagram as a sampler and analog-to-digital converter. This unit is of any suitable or known form operated by recurring impulses form a clock circuit 14 so as to derive periodic samples of the input signal at the clock frequency. In the illustration the clock circuit is assumed to comprise a tenstage ring counter 16 which recycles at a frequency of 8 kilocycles per second and produces an output clock frequency of 80 kilocycles per second by summing the outputs 16_a_ from the individual counter stages in a common conductor 18. Conductor 18 is connected to deliver sampling control pulses to the sampler 12. This sampling rate of 80 kilocycles per second in the illustration is chosen as the minimum sampling frequency which, according to the sampling theorem, will avoid folding a signal having a spectrum component as high as 40 kilocycles per second. To avoid folding, the sampling frequency should be at least approximately twice the upper frequency of the signal being sampled, otherwise it would not be possible to distinguish between different parts of the original spectrum. However, depending upon the number of bands into which it is desired to divide the input signal in the first filtering stage of the system, thereby determining the required effective bandwidth of each output of the first stage, the sampling frequency should be made no higher than is necessary or it will add unduly to the required total number of stages and weighting network elements, hence to system cost. This fact will become more fully evident as the description proceeds.

In the illustrated system the signal samples derived in unit 12 are also digitally quantized by this unit for application to the digital shift register 20 as a sample storage device. While in some cases there are advantages in converting the analog signal to a digital quantity expressed as one bit (plus or minus), the illustration generalizes to the case of $x$ bits with $x$ being equal to 3 in the specific example. Thus the signal sample value emerging from unit 12 is a digital number expressed as a three bit word applied to the initial multi-unit stage $P_1$ of the multistage digital shift register 20. It was stated previously that the number of stages required in the digital shift register is determined by the desired width of the bands into which the original signal spectrum is to be divided by the band filter, and by the sampling frequency. In the illustration the zero to 40 kilocycles per second signal spectrum is assumed to be divided into ten equal bands each of 4 kilocycles per second width. It may readily be shown that with a 4 kilocycles per second bandwidth, signal information must be stored and analyzed for a time period not less than 0.5 millisecond; otherwise the spectral analysis of the signal, that is the resolution of the signal components into bands of 4 kilocycles per second width, will not be sufficiently accurate, i.e. sufficiently definitive, for practical purposes. Thus digital shift register 20 must be capable of continuingly storing the samples dervied over a 0.5 millisecond period, or at the sampling frequency of 80 kilocycles per second, a total of 40 samples in all. In the usual manner each of the digital shift register stages $P_1, P_2 \ldots P_{40}$, except for the first and last stages, has an output connection for transferring its data to the next succeeding stage and an input connection for receiving data from the next preceding stage, these functions occurring simultaneously in response to a shift impulse applied to all the stages from a suitable source such as conductor 18. In the last stage $P_{40}$, the data stored in it and under process at the time it receives new data from the next preceding stage is simply lost from the system whereas the first stage $P_1$ receives its new data from the unit 12 in response to operation of that unit to sample the signal and convert the sampled analog value into digital form in response to a sampling control pulse 18. Unit 12 has its own internal clock 12_a_ operable at high frequency concurrently with each sampling operation so as to control the conversion of the analog value into digital information comprising a "word" made up of $x$ bits (three in the example). Each time a new sample is applied to the digital shift register and the previously stored samples are shifted from stage to stage therein the shift register 20 will of course contain digital information representing the instantaneous value of the input signal and a series of preceding values representing 0.5 millisecond of its immediate past history. When properly processed this amount of information regarding the signal is sufficient to separate the signal into 4 kilocycles per second bands having practicable definition or accuracy to be useful.

Utilization or processing of the stored samples is on the same continuing basis as the sampling and storage of signal information. For this purpose the signal samples in the respective stages of the shift register are all applied to each weighting network of a series of weighting networks $W_1, W_2 \ldots W_{10}$. Each such network performs a weighting and summation function out of which emerges a composite of frequency components of the signal within a particular band of the signal spectrum. Each weighting network comprises a plurality of resistance elements 22 respectively connected to the output terminals of the flip-flops or other trigger circuit units making up the bit storage units of each stage in shift register 20. The response or convolution function of each network is determined by the choice of resistance values therein. All are connected ultimately to a common summing junction 24, in turn connected to one of the network output terminals $O_1, O_2 \ldots O_{10}$. Thus the resistance values in network $W_1$ are designed to process the stored signal samples so as to select frequency components in the zero to 4 kilocycles per second band. Similarly, the output terminal $O_2$ of weighting network $W_2$ will be provided with a composite of signal frequency components in the band 4 kilocycles per second to 8 kilocycles per second, while in like manner each of the succeeding output terminals from the matrix of weighting networks will carry succeeding 4 kilocycles per second bands, the last ($W_{10}$) carrying components in the band from 36 kilocycles per second to 40 kilocycles per second.

The weighting network resistance values necessary to achieve a desired response function in a sampling type filter are determined in accordance with well known principles and are found to parallel those applicable to analog filter design. The weighting resistors associated with the bit storage units of each shift register stage will be weighted in accordance with the relative values of those bits making up the word of information carried by the stage. Thus on a binary scale if the first bit of data stored in one stage is weighted to have a value 10 then the second bit in that stage will be weighted to have a value 5, and the third bit a value of 2½. In order to give comparable weight to the significance of the bits in a stage the weighting network resistors associated with that stage will be assigned related values. However, since the first stage $P_1$ carries the most recent signal sample and the succeeding stages $P_2$, $P_3$, etc. carry successively older samples of the original signal it is necessary that the effective network resistance values associated with the different stages be chosen in accordance with the required convolution function of a filter so that the network output terminal will carry the proper convolution of the original signal with respect to the particular band which the network is to separate from the other bands.

As will now be evident, the band filter output terminals $O_1$, $O_2$ . . . $O_{10}$ carry respective composites of signal frequency components in their respective bands, zero to 4 kc. per second, 4–8 kc. per second . . . 36–40 kc. per second. These signal composites are in analog form and are stepped in value, the steps occurring synchronously with the sampling of the input signal at terminal 10. These band filter outputs represent interim signals in the system which are to be processed further so as to divide the bands into sub-bands or system output frequency components of predetermined bandwidth. In the illustration the width of each sub-band is selected to be 1 kilocycle per second, but it will be evident that, like the division into bands, the factor of division into sub-bands is subject to choice of design. For example, in the case of a 40 kilocycle per second signal spectrum to be divided into 40 one-kilocycle output sub-bands, the initial division into bands may be by a factor of 10 and the ensuing division into sub-bands by a division factor of four, as shown. As one alternative, the band filter may divide by eight and the resultant eight bands sub-divided into 5 sub-bands, making up a total of 40 sub-bands. Other alternatives include using a larger number of filter stages. For instance, the original spectrum may be divided into four bands, which in turn may be divided into five sub-bands, and each of these into two sub-sub-bands. Dividing repeatedly by two until the desired division ratio is achieved represents still another alternative and has the advantage of lending itself to standardized modular conduction of all filter stages. The choice in any case will normally be based upon economic considerations having reference to the total number of components and their interconnections, assembly costs, etc.

Each of the band filter output stepped analog waves delivered by the respective terminals $O_1$, $O_2$ . . . $O_{10}$, is applied to a different one of a series of gates $G_1$, $G_2$ . . . $G_{10}$ so as to pass by its gate to a common conductor 26 during any instant in which the particular gate in its turn is rendered conductive by an applied gating impulse delivered from one of the respective stages of timing ring counter 16 through the respective conductors 28. In this manner the successive gates controlled by the respective stages of ring counter 16 serve to multiplex the band filter outputs onto a second sampler and analog-to-digital converter unit 30, much like, or identical to, the unit 12 in its function to sample the applied analog signal and convert the analog value into a digital number value in response to the internal sequencing operation produced by its clock 30*a*. Preferably, although not necessarily, sampling of the band filter outputs is synchronized with sampling of the original signal at input terminal 10, this being effected in the illustration by applying the clock pulses in conductor 18 to the unit 30 as shown. In any case the sampling in unit 30 should occur in timed relation with the sequential operation of the successive gates $G_1$, $G_2$ . . . $G_{10}$ such that the successive digital outputs of unit 30 represent the band filter outputs occurring in regular sequential order.

The digital values developed in unit 30 may be expressed in any desired number of bits or significant numerical places so as to represent the band filter outputs with the requisite degree of definitional accuracy for application to the sub-band filter digital shift register 40. In the illustrated case each "word" or digital band signal value is expressed in four bits and is applied to the shift register 40 through the respective conductors 42, 44, 46, and 48. All stages and all units within each stage are triggered for shifting the sample data stored therein from one stage to the next synchronously with application of each new sample by unit 30 to the register 40. For this purpose shift pulses from clock conductor 18 are applied to the stages of shift register 40 as depicted. However, shift register 40 is preferably made up of one or more modules of the commercially available factory-assembled type in which external leads are provided only for the first and last stages. In the total assembly of modules shown, in addition to the module interconnections and the register input, the register provides external output leads from every $n^{th}$ stage, with the intervening stages being internally connected to each other and to the end stages, $n$ being equal to the number of signal bands to be subdivided. In the example, wherein the sub-band filter register 40 divides each of the ten band signals by a factor of four, into one-kilocycle per second sub-bands, the sub-band width requires a minimum storage capacity of the shift register of approximately 2 milliseconds in order to define or separate the sub-bands with a sufficient degree of resolution to be practicable for most purposes. Consequently, at a sampling frequency of 80 kilocycles per second, it will be evident that the digital shift register 40 should be designed with approximately 160 stages. In practice somewhat fewer stages may be acceptable, whereas a greater number are desirable if the resolutional accuracy of the system needs to be increased. Since the outputs from register 40 are taken from the first stage of each module of ten stages, it is desirable that there be one additional stage added to the last module if the last nine stages of the last module are to be useful. This in the example shift register 40 is shown with 161 stages in all.

The sub-band filter has four sub-band outputs I, II, III and IV which are respectively connected through weighting and summation networks $Y_1$, $Y_2$, $Y_3$ and $Y_4$ to all of the output stages (every $n^{th}$ stage) of shift register 40. The individual resistance elements 42 of the weighting networks are connected respectively to the flip-flops or other trigger circuits representing the digital place storage units within each such stage as shown. The values assigned to the respective network resistances are determined in the same manner as in the case of the band filter. In each network the relative weighting of resistance elements connected to the internal bit value units of each shift register stage is determined by the relative significance or value on the binary scale of the digital bits of information stored in the respective units of that stage to which the resistors are respectively connected. The relative weighting of network resistors as between successive stages of the digital shift register, in any of the four networks, is determined by the convolution function necessary to provide frequency selectivity at the particular sub-band frequency to be produced in the associated output terminal I, II, III or IV. Even though in the example forty sub-band frequencies are to be represented in the output of the system, the sub-band filter is required to incorporate only four system output terminals and only four associated sub-band filter networks. This savings is a result of the combined multiplexing or time-sharing function and frequency folding function performed on the ten interim signal band signals (at terminals $O_1$, $O_2$ . . . $O_{10}$) by the sequentially and recurringly activated gates $G_1$, $G_2$ . . . $G_{10}$.

With mroe specific reference to the arrangement and function of shift register 40 and associated components, it has been stated that each of the sub-band filter weighting and summation networks $Y_1$, $Y_2$ . . . $Y_4$ is connected to every $n^{th}$ register stage and that the interim stages are required to have no external output leads. It has also been stated that $n$ in this case equals 10. It will also be remembered that the band filter outputs $O_1, O_2 \ldots O_{10}$ are each impressed recurringly on the unit 30 for sampling and conversion into digital form at only 8 kilocycles per second (one-tenth of the frequency at which the sampler and converter unit 30 operates with respect to all ten of the band filter outputs). Thus it will be clear that, with the shift register 40 saturated with stored samples, each time the output stages $A_1, A_2 \ldots A_{17}$ of register 40 carry the current sample and the next preceding sixteen samples of band filter output $O_1$, the next succeeding stages $B_1, B_2 \ldots B_{16}$ then carrying the current sample and the next preceding fifteen samples from output $O_{10}$, etc., with stages $J_1, J_2 \ldots J_{16}$ then carrying the last sample and next preceding fifteen samples from output $O_2$. Therefore, on one sampling cycle of units 12 and 30 sub-band filter output terminals I, II, III and IV respectively carry signal components in sub-bands 1 to 2 kilocycles per second, 2 to 3 kilocycles per second and 3 to 4 kilocycles per second, covering the total four-kilocycles per second band from band filter output $O_1$. On the next succeeding sampling cycle (one eightieth of a millisecond later) these same sub-band filter output terminals I, II, III and IV carry respective sub-band components of zero to one kilocycle per second, 1 to 2 kilocycles per second, 2 to 3 kilocycles per second and 3 to 4 kilocycles per second, but now, due to the frequency folding and time-sharing action of the band sampling operation these components represent the sub-bands in the band of 4 to 8 kilocycles per second appearing in output terminal $O_2$, which on the last preceding sampling cycle had been stored in the stages $J_1, J_2 \ldots J_{16}$ of shift register 40. The zero to one-kilocycle per second components now carried in sub-band filter output I are a true reflection of the signal components in the sub-band 8 to 7 kilocycles per second (from band filter output $O_2$), while the 1 to 2 kilocycles per second components appearing in output II correspond to the 7–6 kilocycle per second components, the 2 to 3 kilocycles per second represent the 6–5 kilocycles per second and the 3 to 4 kilocycles per second represent the 5 to 4 kilocycles per second component, all from output $O_2$. On the next succeeding sampling cycle the sub-band filter output terminals carry components representative of the sub-bands in output terminal $O_3$. The sub-band filter time-sharing process continues step-by-step through the series of band filter outputs until the cycle is completed, the cycles recurring in immediate succession on a continuing basis for as long as the system operates.

Figures 2, 3:
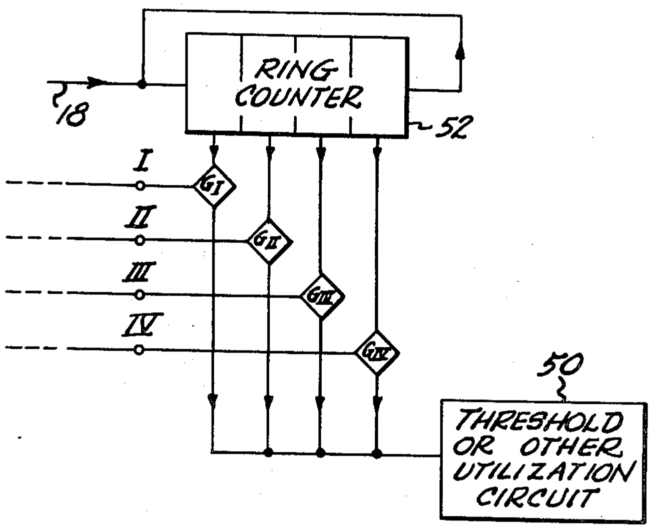
FIG. 2 is a tabulation of the sub-band frequencies which are represented in the respective sub-band filter outputs at different times during the sub-band filter timesharing cycle, assuming those frequency components occur in the original signal spectrum.
FIG. 3 is a diagram of an arrangement for utilization of the sub-band filter bank outputs.

It will thus be evident that common use fo the same digital shift register 40 and the four weighting and summation networks for all of the ten bands is made possible by the fact that each of the band filter outputs $O_1, O_2 \ldots O_{10}$ is sampled at a recurrence frequency (in this case 8 kilocycles per second) selected so as to fold the component frequencies in the respective outputs (all except the first output $O_1$, which is already in the band zero to four kilocycles per second) down into the same band of frequencies, namely zero to four kilocycles per second at which the sub-band filter circuit is operative. The tabulation in FIG. 2 illustrates the frequency relationships in terms of the actual signal frequency components which are represented by the zero to 1, 1 to 2, 2 to 3, and 3 to 4 kilocycles per second components appearing in the system outputs I, II, III and IV at different sequential points in the total cycle of operation of the series of multiplexing gates $G_1, G_2 \ldots G_{10}$. As an example, from this tabulation it will be seen that sub-band output III for example in the fifth period of the gate sequence (i.e. when gate $G_5$ is activated) will carry frequency components corresponding to those signal components in the range of 18 to 19 kilocycles per second.

Not only does the sub-band filter serve multiple duty in this manner, but the particular way in which multiplexing or time-sharing is combined with frequency folding utilizing the same circuits (the gates and gate sequencing source) also effects savings by use of common elements to perform multiple functions.

In order to balance the gains of the several band channels in the band filter, grounded shunt resistors $S_1, S_2, S_3 \ldots S_{10}$ of selected values are connected to the respective summing junctions 24 of the band networks as shown. Likewise gain balance in the respective sub-band filter channels is achieved in similar manner by the resistors $R_1, R_2, R_3$ and $R_4$. Use of balancing resistors for summing networks is embodied in my copending application Ser. No. 547,686 filed Apr. 4, 1966 entitled Power Spectrum Adapter.

In FIG. 3 there is illustrated a means by which to multiplex the system output components in channels I, II, III and IV into a common threshold or other utilization circuit 50. This also involves use of gates, ($G_I$, $G_{II}$, $G_{III}$ and $G_{IV}$) connected to respective output terminals, and a sequential gate-operating device such as the ring counter 52 as shown. The gating frequency required to multipex the output signals in channels I, II, III and IV depends on the bandwidth required in the outputs and in general is not critical in value.

In case the orginal signal spectrum does not extend to zero frequency some method is employed to shift the signal spectrum into a band which does extend to zero preliminary to further processing in accord with this invention. In some cases this may be done by heterodyning, using a beat frequency source, mixer and band filter. Alternatively this may also be done by frequency folding. In the latter event let it be assumed that the original signal is $f_2-f_1$ and by folding is to be shifted into a range $f_2'-f_1'$ preparatory to filtering by the technique illustrated in FIG. 1. This may be done conveniently in accordance with a further feature of the invention by proper choice of the frequency at which the original signal $f_2-f_1$ is sampled and converted into a digital form by unit 12 for application to shift register 20. To effect the desired initial folding, sampling is done at a frequency $f$ equal to $2f_{2/N}$, where N is as large as possible but chosen to satisfy the equation $N(f_2-f_1) < f_2$. It will be evident that alteration of the clock frequency applied to conductor 18 serves as a means to alter the signal frequency range for which the digital filter bank is operative. This frequency adaptability of the system makes it a versatile instrument having many laboratory uses as well as specialzed practical uses in the field including such applications as Doppler radar signal analysis and recognition. The resultant signal spectrum will lie in the band $f_2'-f_1'$ where $f_1'$ is zero and where $f_2'$ is equal to or exceeds $f_2-f_1$. For example in case of an original signal in the band 80 kc./s.–40 kc./s. the choice of 80 kc./s. sampling frequency produces folding about the 40 kc./s. point and makes $f_2'$ equal to 40 kc./s. The system from that point forward may then be identical to that illustrated in FIG. 1 as to values chosen from components, etc. However in the case of a 40 kc./s. band in the region of 100 kc./s.–60 kc./s. folding will be effected by sampling at 100 kc./s., so that samples from the original band are now processed as if in the zero to 50 kc./s. band. In this case the gating frequency used with the outputs of the band filter in the case of division into ten bands will be 10 kc./s. and the resultant bands will be 5 kc./s. wide instead of 4 kc./s.

In performing its frequency selective response function the filter bank of this invention delivers a plurality of outputs which are respectively selective of different spectral regions (i.e. signal sub-band or component frequencies). However, the regions so selected need not be discrete, flat in response magnitude, nor contiguously related. They will usually overlap, with the response in each output cresting at some part of the sub-band or frequency to which the particular output channel is made selectively responsive. It is therefore intended that such language as "separating the signal frequencies—into successive frequency sub-bands", or "separating said—band into its component frequencies," etc., is to be broadly construed so as to cover all such cases. In the same vien, reference to "sub-bands of predetermined spectral width" is not intended necessarily to imply discrete bandwidth or a flat response characteristic between limits, but primarily connotes spectral separation of successive output responses, and again, includes the possibility of frequency overlaps in the outputs, prior to any folding operation in the system, however it is desirable that the spectrum being folded be band-limited, although it is not important within the band limits that the signal components be of the same magnitude.

These and other aspects of the invention will be evident to those skilled in the art having reference to the present disclosure of the preferred embodiment.

What is claimed is:

1. In a signal filtering system, in combination with means operable to separate an input signal into a plurality of band signals representative of different frequency bands of said input signal, apparatus for sequentially sampling said band signals recurringly, the sampling recurrence frequency being the same for all band signals and being selected according to the sampling theorem so as to unambiguously fold the frequency components of each such band signal down into a common frequency band extending from zero to half the sampling recurrence frequency, such recurrence frequency being at least as great as twice the width of the widest of said bands, and filter means having an input to which the sequential signal samples are continuingly applied, having a plurality of separate outputs corresponding to sub-bands of the common band, having means to store a continuing succession of said signal samples, and having means to weight and summate said stored samples including a plurality of weighting networks each having a number of weighting elements to which the respective stored signal samples are applied, thereby to produce in the respective outputs sequentially, on a time-sharing basis, the frequency components representing sub-bands of the different band signals.

2. The system defined in claim 1 including means to digitally quantize the signal samples before application to the filter means, and wherein the means to store comprises a digital shift register having external output leads connected to the weighting networks from every $n^{th}$ stage of the register, where $n$ is the number of band signals being sampled.

3. The system defined in claim 1 wherein the means to sequentially sample the band signals comprises a series of gates respectively connected so that when actuated the gates pass the different individual bands momentarily to the filter means, and means to actuate said gates in sequential order recurringly.

4. In a signal filtering system, in combination with means providing in electrically separate relationship a plurality of band signals representative of different frequency bands, apparatus for sequentially sampling said band signals recurringly, the sampling recurrence frequency being the same for all band signals and being selected according to the sampling thereon so as to unambiguously fold the frequency components of each such band signal down into a common frequency band extending from zero to half the sampling recurrence frequency, such recurrence frequency being at least as great as twice the width of the widest of said bands, and filter means having an input to which the sequential signal samples are continuingly applied, having a plurality of separate outputs corresponding to sub-bands of the common band, having means to store a continuing succession of said signal samples, and having means to weight and summate said stored samples including a plurality of weighting networks each having a number of weighting elements to which the respective stored signal samples are applied, thereby to produce in the respective outputs sequentially, on a time-sharing basis, the frequency components representing sub-bands of the different band signals.

5. In a signal filtering system, in combination with means providing in electrically separate relationship a plurality of band signals representative of different frequency bands, apparatus for sequentially sampling said band signals recurringly, the sampling recurrence frequency being the same for all band signals and being selected according to the sampling theorem so as to unambiguously fold the frequency components of each such band signal down into a common frequency band extending from zero to half the sampling recurrence frequency, such recurrence frequency being at least as great as twice the width of the widest of said bands, and filter means having an input to which the sequential signal samples are continuingly applied, having a plurality of separate outputs corresponding to sub-bands of the common band, thereby to produce in the respective outputs sequentially, on a time-sharing basis, the frequency components representing sub-bands of the different band signals.

6. A sampling type filter system for simultaneous separation of the frequency components of a signal into a plurality of successive sub-bands of predetermined spectral width, comprising means to recurringly sample the instantaneous signal at predetermined recurrence frequency, filter means having an input to which the signal samples are applied and a series of outputs, said filter means being operable to produce in each of said outputs frequency components of the signal occurring in each of successive different respective frequency bands each a width $\Delta f$, means to recurringly sample the instantaneous signal values in the respective frequency band outputs in sequential order, the recurrence frequency being selected as $2\Delta f$ so as to fold the signal component frequencies in each band down into a common lower-frequency band, and sub-band filter means having an input to which the output signal samples are continuingly applied, and having a plurality of separate system outputs corresponding to the respective sub-bands in the common lower-frequency band, said sub-band filter means being operable for producing in the respective system outputs frequency components representing sub-bands of the signal in each of the bands being sampled, whereby the sub-band filter means is time-shared by the band filter outputs.

7. The system defined in claim 6, wherein the band and sub-band filter means respectively comprise first and second digital shift registers, respective means to digitally quantize the samples applied to the shift registers, and separate sets of weighting networks having elements connected to stages of the respective shift registers so as to integrate the samples stored in such stages of the shift registers.

8. A sampling type filter system for simultaneous separation of the frequency components of a signal into a plurality of successive sub-bands of predetermined spectral width, comprising means to recurringly sample the instantaneous signal at predetermined recurrence frequency, filter means having an input to which the signal samples are applied and a series of outputs, said filter means being operable to produce in each of said outputs frequency components of the signal occurring in each of successive different frequency bands each of a width $\Delta f$, means to recurringly sample the instantaneous signal values in the respective frequency band outputs in sequential order, the recurrence frequency being selected as $2\Delta f$ so as to fold the signal component frequencies in each band down into a common lower-frequency band, and sub-band filter means having an input to which the output signal samples are applied, a plurality of separate system outputs corresponding to the respective sub-bands in one of said bands, means to store a continuing succession of said output signal samples, and means to continuingly weight and summate said stored values including a plurality of weighting networks each having a number of weighting elements to which the respective stored samples are applied for producing in the respective system outputs frequency components representing sub-bands of the signal in each of the bands being sampled in time sequence with the other bands, whereby the sub-band filter means is time-shared by the band filter means outputs.

9. In sampling type filtering, the method of separating each of a plurality of band signals into successive sub-bands comprising the steps of sequentially sampling the separate band signals recurringly, the sampling recurrence frequency being the same for all band signals and selected according to the sampling theorem so as to fold the frequency components of each band signal down into a common lower frequency band extending from zero to half the sampling recurrence frequency, and sequentially filtering the recurrent band signal samples into sub-bands of the common frequency band in timed relationship with the sequential sampling of the band signals, so as to correlate such sub-bands of the common lower-frequency band with sub-bands of the respective band signals.

10. The method of filtering frequency components from a composite signal occurring in the frequency band $f_1$ to $f_2$, where $f_2$ exceeds $f_1$, and $f_1$ is greater than zero comprising: converting the signal $f_1$ to $f_2$ into a signal $f_1'$ to $f_2'$, where $f_1'$ is zero and $f_2'$ is equal to or exceeds $f_2$ minus $f_1$, dividing the signal $f_1'$ to $f_2'$ into a plurality of equal bands of a width $\Delta f$, recurringly sampling all of said bands in predetermined successive order at a recurrence frequency of $2\Delta f$ so as to fold the frequency components in each band above the lowest band down into the lowest band, and deriving the frequency components from the resulting samples, which components are thereby related to those of the original signal.

11. The method of filtering frequency components from a composite signal comprising dividing the signal into a plurality of bands, recurringly sampling all of said bands in predetermined successive order at a common recurrence frequency at least as great as twice the widest of said bands and selected according to the sampling theorem so as to fold the frequency components in all bands unambiguously into a common band, and processing the samples in a common filtering operation for deriving the frequency components from the resulting samples, which components are thereby related to those of the original signal.

12. In a frequency selection system, the combination comprising an electrical network comprising a series of data storage elements therein respectively operable to store each of a succession of data values, means to recurringly apply a new data value to the first element in the series, the data values shifting from each element to the next with the application of each such new data value, a plurality of summing networks each having a plurality of impedance elements therein respectively connected to the different storage elements and interconnected to sum the stored data values, and means connected with the respective networks to equalize the gains thereof, such latter means comprising impedance elements connected to a point of predetermined reference potential.

References Cited

UNITED STATES PATENTS

| | | | |
|---|---|---|---|
| 3,167,710 | 1/1965 | Cox | 324—77 |
| 3,297,951 | 1/1967 | Blasbalg | 328—37 |
| 3,325,731 | 1/1967 | Headle | 324—77 |

EDWARD E. KUBASIEWICZ, Primary Examiner

U.S. Cl. X.R.

328—29, 37